United States Patent [19]

Farden

[11] Patent Number: 5,180,271
[45] Date of Patent: Jan. 19, 1993

[54] CYLINDRICAL BALE TRANSPORT DEVICE

[76] Inventor: David O. Farden, Box 539, Pilot Butte, Saskatchewan, Canada, S0G 3Z0

[21] Appl. No.: 777,136

[22] Filed: Oct. 16, 1991

[51] Int. Cl.⁵ .............................................. B60P 1/24
[52] U.S. Cl. .................... 414/24.5; 298/18; 414/470
[58] Field of Search ................. 298/18; 414/24.5, 470, 414/111

[56] References Cited

U.S. PATENT DOCUMENTS

| | | | |
|---|---|---|---|
| 4,092,050 | 5/1978 | Sobeck | 298/18 |
| 4,580,843 | 4/1986 | Lund | 298/18 |
| 4,930,958 | 6/1990 | Palmer | 298/18 X |

*Primary Examiner*—Michael S. Huppert
*Assistant Examiner*—Janice Krizek
*Attorney, Agent, or Firm*—Adrian D. Battison; Stanley G. Ade; Murray E. Thrift

[57] ABSTRACT

A trailer for transporting cylindrical bales includes a central frame portion and two side support members. The central frame portion defines two outwardly inclined upper surfaces for receiving the bales extending outwardly from a central apex. The side support members are pivotally mounted adjacent the sides of the central frame and in initial position provide two parallel V-shaped receptacles for two rows of bales. A third row of bales can be mounted on top of the first two rows in the V-shaped area therebetween. The side support members are latched in the transport position and can be released manually so the first one of the side support members pivots downwardly allowing the first and third rows of bales to be discharged. Subsequently the side support members on the other side is released allowing the second row to be discharged. The side support members can be pivoted inwardly to a highway width which automatically resets the latch mechanism.

13 Claims, 4 Drawing Sheets

CYLINDRICAL BALE TRANSPORT DEVICE

FIELD OF THE INVENTION

This invention relates to a transport device for transporting cylindrical bales.

BACKGROUND OF THE INVENTION

Various designs of transport device for cylindrical bales have been provided previously. In one arrangement of transport device, there are provided on a trailer two parallel longitudinal receptacles. The bales are loaded from a front end of the receptacles and move rearwardly by pushing the bales longitudinally along the receptacles in end-to-end position. The bales are then discharged by pushing the bales beyond the end of the receptacles so they discharge from the end of the trailer.

An alternative design of bale transport device includes two parallel receptacles but in this case the receptacles are pivoted about a horizontal axis at the base of the receptacle so that in the first position the bales lie in two rows with the receptacles inclined slightly inwardly so the bales contact along a centre line of trailer. The discharge in this case is effected by pivoting the receptacles simultaneously outwardly about their respective horizontal axis so that each receptacle discharges to a respective side of the trailer. This type of transport unit has the advantage over the first type described above in that it is significantly less expensive and of a relatively simple construction and in some cases the device can be actuated by cable without the necessity for any hydraulic systems for providing power. This again therefore significantly decreases the cost of the product. However a device of this type cannot accommodate a third row of bales mounted upon the V-shaped area between the first two rows of bales since the third or upper row of bales would simply be dropped vertically downwardly onto the trailer as the bales in the first two rows are discharged outwardly. This system therefore limits the number of bales which can be transported and thus requires of course more transportation trips to transport a predetermined number of bales.

A third type of bale transporting device which is currently available simply includes an elongate beam of the trailer on which is mounted a plurality of separate receptacles each for receiving an individual bale. In this case the unloading of the bale is carried out in a simple manual manner by unlatching the receptacle and manually pivoting the receptacle about a horizontal axis to discharge the single bale. This device has the advantage that it is very simple and inexpensive but it requires significant manual effort and in addition the number of bales which can be transported is limited effectively to a single row.

SUMMARY OF THE INVENTION

It is an object of the present invention, therefore, to provide an improved bale transporting device which can be manufactured economically, can be actuated simply without the necessity for complex and expensive hydraulic systems and in addition be able to transport a third row of bales on top of a first two rows of bales while allowing the bales to be unloaded from all three rows without difficulty and without danger to the operator.

According to the invention, therefore, there is provided a bale transport device comprising a frame arranged for transport across the ground in a transport direction, the frame including a plurality of elongate longitudinal frame rails generally parallel to the transport direction and defining a length of the frame sufficient to receive thereon a predetermined number of cylindrical bales with an axis of the bales parallel to the frame members and a plurality of cross rails interconnecting the longitudinal frame rails, the frame including two parallel sides, a longitudinally extending apex portion arranged centrally between the sides and the two inclined support portions each defining a fixed support surface for receiving said bales thereon and inclined downwardly from the apex portion to a respective one of the sides of the frame; two side support members each of which is pivotally mounted on the frame at a respective one of the sides for pivotal movement about a longitudinal horizontal pivot axis at the respective side of the frame, each of the side support members being formed from longitudinal and transverse rails and defining a support surface for receiving said bales thereon, each of the side support members being pivotally movable about said pivot axis to a first support position in which the support surface of the side support member is inclined outwardly and upwardly from the respective side so as to form with the support surface of a respective one of the inclined support portions a V-shaped receptacle for said bales, to a second unload position in which the support surface of the side support member is inclined outwardly and downwardly to allow a bale from said receptacle to roll under its own weight outwardly and downwardly for unloading onto the ground; and means for retaining said side support members in the first support position.

According to a second aspect of the invention there is provided a method for transporting cylindrical bales comprising providing a frame arranged for transport across the ground in a transport direction, the frame including a plurality of elongate longitudinal frame rails generally parallel to the transport direction and defining a length of the frame sufficient to receive thereon a predetermined number of cylindrical bales with an axis of the bales parallel to the frame members and a plurality of cross rails interconnecting the longitudinal frame rails, the frame including two parallel sides, a longitudinally extending apex portion arranged centrally between the sides and the two inclined support portions each defining a fixed support surface for receiving said bales thereon and inclined downwardly from the apex portion to a respective one of the sides of the frame; providing two side support members each pivotally mounted on the frame at a respective one of the sides for pivotal movement about a longitudinal horizontal pivot axis at the respective side of the frame, each of the side support members being formed from longitudinal and transverse rails and defining a support surface for receiving said bales thereon; pivotally moving each of the side support members to a first support position in which the support surface of the side support member is inclined outwardly and upwardly from the respective side so as to form with support surface of a respective one of the inclined support portions a V-shaped receptacle for said bales, loading a first row and a second row of bales onto a respective one of the V-shaped receptacles having a predetermined number of bales arranged end-to-end with the axis thereof longitudinal of the V-shaped receptacle, loading a third row of bales onto the V-shaped area between the first and second rows of bales, transporting the three rows of bales to a required unload destination, pivotally moving a first one only of the side support members to a second unload position in which the support surface of the first one only of the side support members is inclined outwardly and downwardly to allow the first row of bales and the third row of bales to roll under the weight of the bales outwardly and downwardly for unloading onto the ground and subsequently pivotally moving a second one of the side support members to an unload position in which the support surface of the second side support member is inclined outwardly and downwardly to allow the second row of bales to roll under the weight of the bales outwardly and downwardly to a respective side of the frame for unloading onto the ground.

One embodiment of the invention will now be described in conjunction with the accompanying drawings, in which:

DESCRIPTION OF THE DRAWINGS

In the drawings like characters of reference indicate corresponding parts in the different figures.

DETAILED DESCRIPTION

Figure 1:
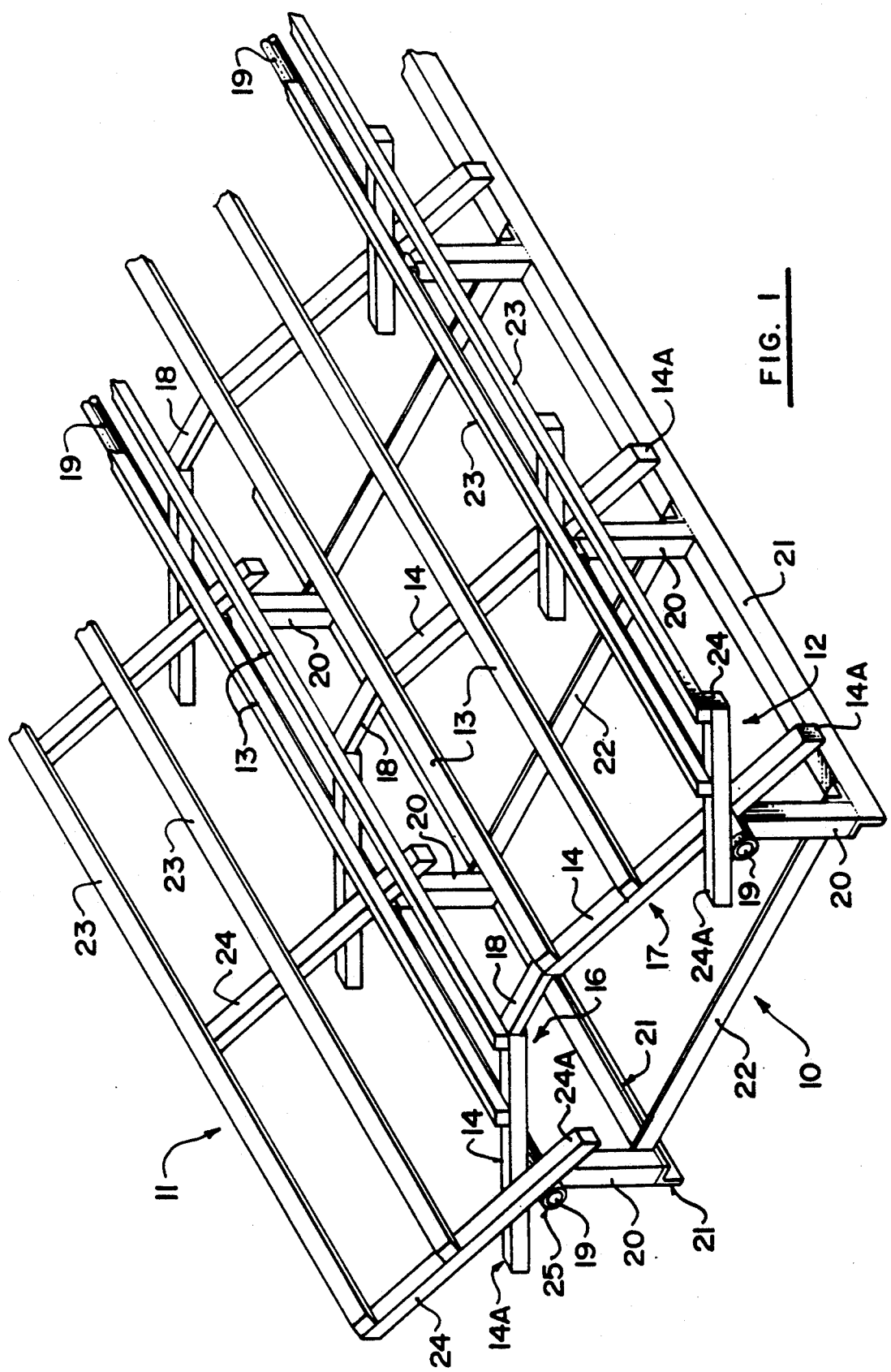
FIG. 1 is an isometric view showing schematically a bale transport device according to the present invention with the latching mechanism of FIGS. 4 and 5 omitted for convenience of illustration.

The transport device as illustrated includes a central frame section generally indicated at 10 and a pair of side support members 11 and 12 mounted on the central frame each for pivotal movement about a horizontal longitudinal axis of the frame.

The central frame is formed from a plurality of longitudinal frame rails 13 and transverse frame rails 14 which are welded together to form a frame structure the length of which is sufficient to receive one or more cylindrical bales arranged end-to-end with the axis of the bales longitudinal of the frame. The frame can thus be formed to different lengths in accordance with requirements to provide different loading capacities. The rails 13 and 14 are formed into an A-shape with a central apex 15 and two downwardly inclined side portions 16 and 17. The portions 16 and 17 are connected together by a plurality of horizontal straps 18 at the apex section so as to form a flat top and to space the side portions 16 and 17 at a suitable distance to receive the bales as discussed hereinafter.

The transverse rails 14 are attached to a longitudinal shaft or pipe 19 adjacent the sides of the frame but spaced inwardly from the outer end of each of the rails 14. Thus the portion of the rails 14 as indicated at 14A hangs over the outer shaft 19. The shaft 19 is supported upon a plurality of vertical struts 20 at spaced positions along the length of the frame. The struts 20 are welded to the top of an angle iron 21 which also extends longitudinally of the frame so both the shaft 19 and the angle iron 21 extend the full length of the frame. A horizontal base rail 22 extends across between the struts 20 to complete the polygon forming the central frame and to provide structural strength for the central frame to receive the weight of the bales as discussed hereinafter.

Figure 2:
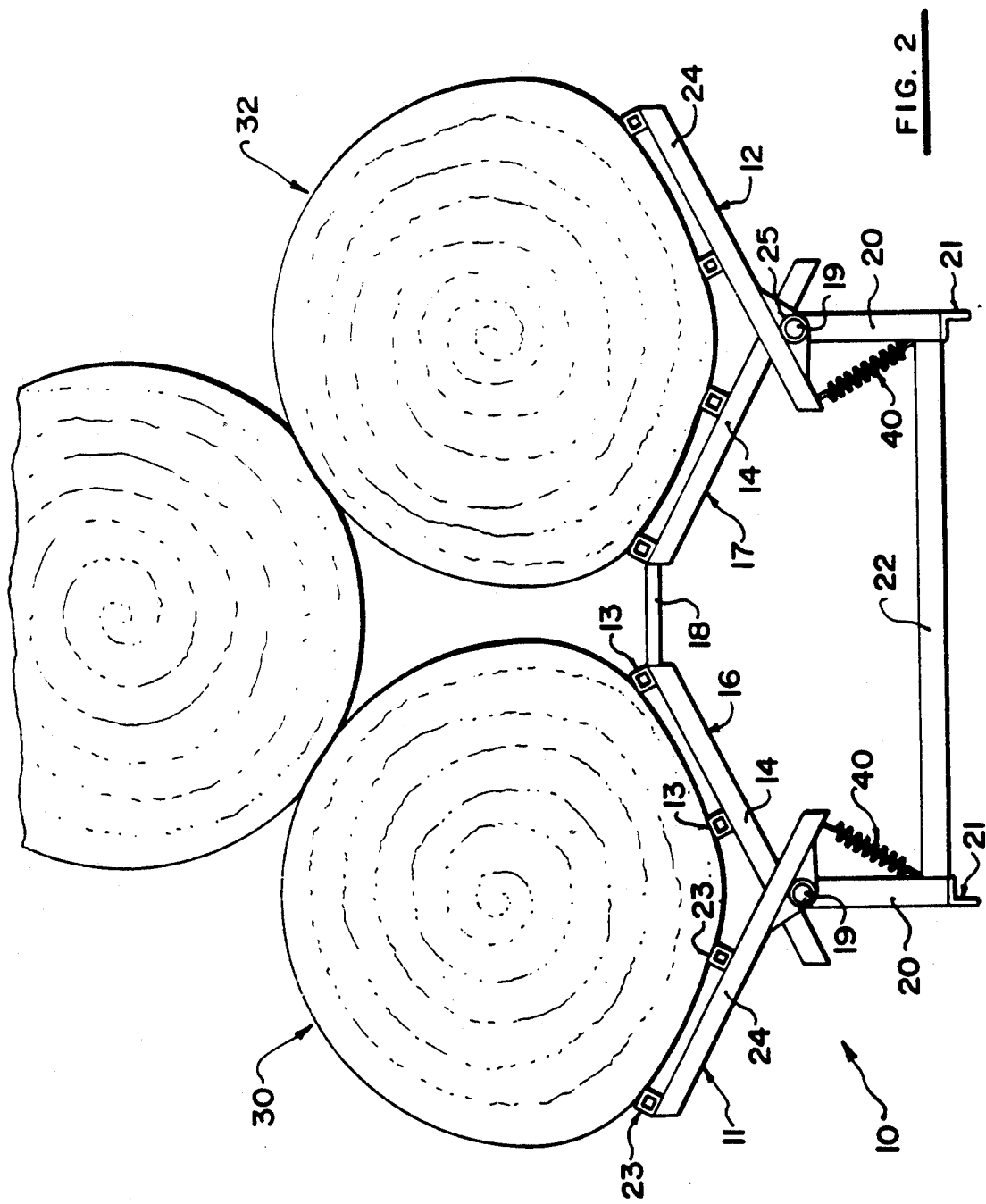
FIG. 2 is a rear elevational view of the device of FIG. 1 showing the device in a transport position loaded with three rows of bales.

The side support members 11 and 12 are similarly formed from longitudinal rails 23 and transverse rails 24. In a symmetrical manner to the rails of the central frame, the transverse rails 24 are connected to collars 25 mounted on the shaft 19 at spaced positions along the length of the shaft so that the side support members are supported by the shaft but are pivoted around the axis of the shaft 19. The transverse frame members 24 include an end portion 24A symmetrical to the end portion 14A which extends beyond the shaft 19 inwardly of the shaft 19. The shaft is best shown in FIG. 2. In the transport position, the side support members 11 and 12 cooperate with the inclined portions 16 and 17 respectively to form V-shaped receptacles each for receiving a respective one of two rows of bales indicated at 30 and 32 respectively.

Figure 3:
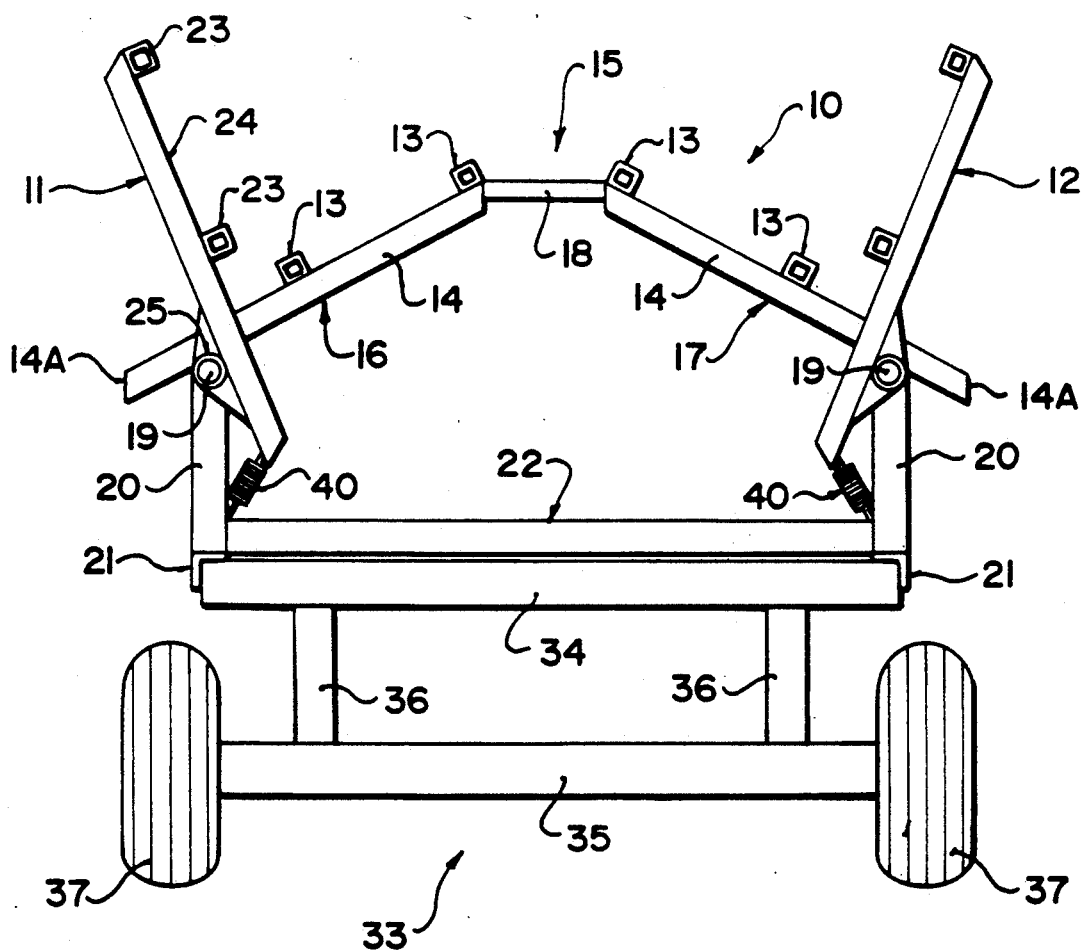
FIG. 3 is a rear elevational view of the device mounted upon a trailer and showing the device in a highway position.

In FIG. 3 a trailer 33 is shown which includes a horizontal upper platform 34 on which the frame is mounted with the platform being received within the angles formed by the angle irons 21 so the frame is stably mounted on top of the trailer. The trailer includes an axle 35 mounted on suspension 36 and including ground wheels 37 by which the trailer can move across the ground.

In an alternative arrangement (not shown) the frame may be directly attached to a suspension system forming the frame into an integral part of a trailer. However it will be appreciated that the details of the trailer will be well apparent to one skilled in the art and therefore there is no necessity to describe here the structure of the trailer system except to note that the frame will include some form of transportation system by which the frame can be moved across the ground for transportation of the bales.

As shown best in FIG. 1, the central frame and the side support members each include transverse rails at spaced positions along the length of the device with the rails being substantially aligned and spaced by suitable distance to provide the necessary structural strength for the device. Thus for example the transverse rail may be arranged at 4 or 5 feet spacing but at each spacing there is provided a rail 24 of the side support member, a rail 14 of the inclined portion and a rail 22 of the base portion.

Figure 4:
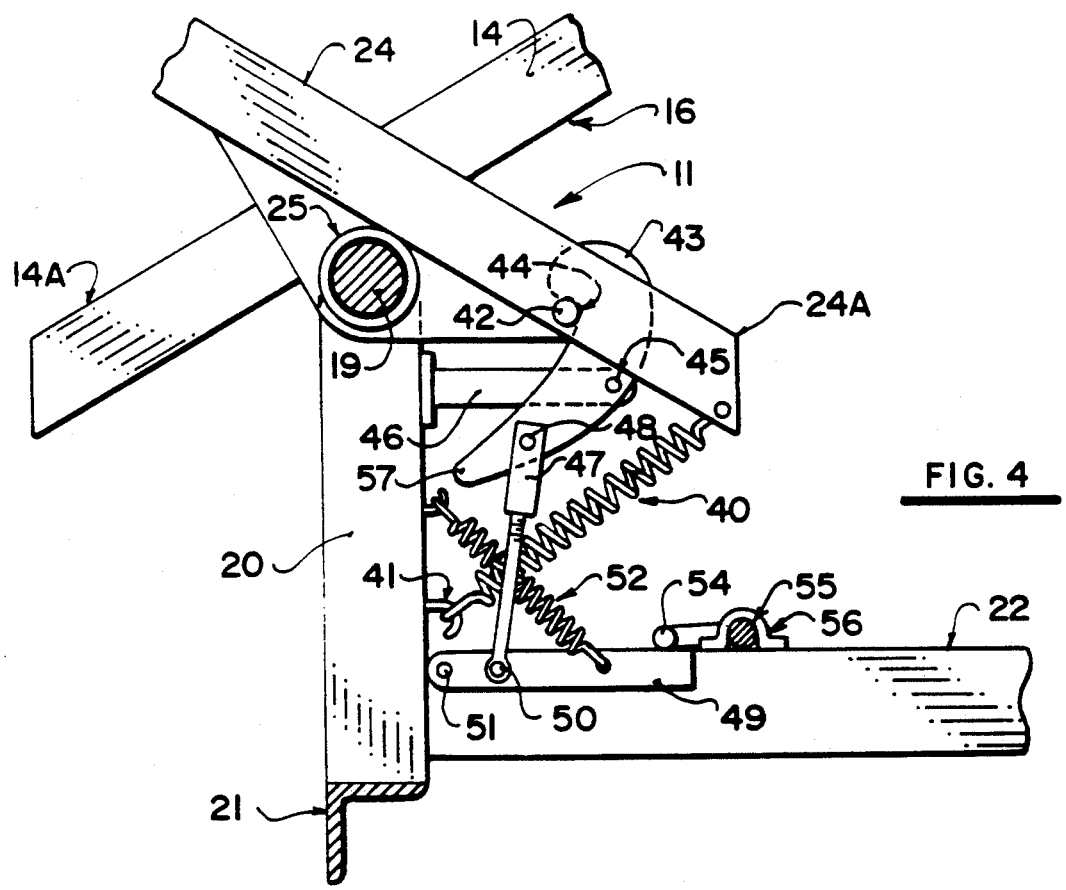
FIG. 4 is a cross sectional view transversely through one part of the device showing the latching mechanism omitted from FIG. 1.
Figure 5:
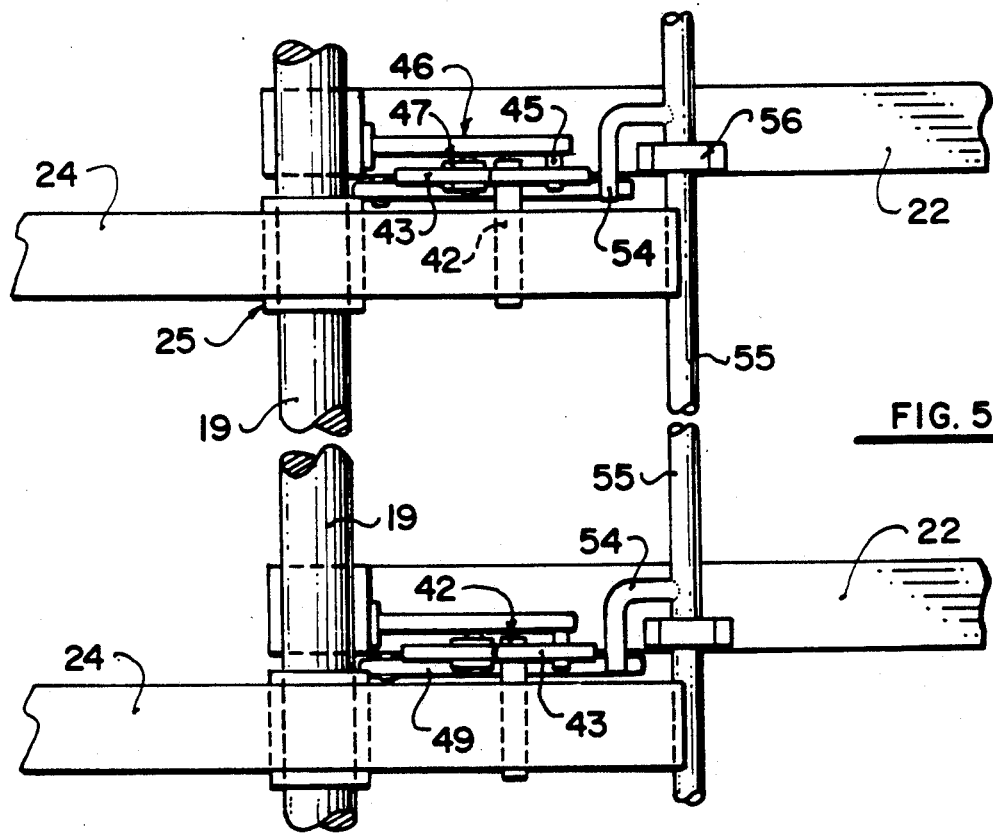
FIG. 5 is a plan view of the portion shown in FIG. 4 again showing the latching mechanism.

The central frame is rigid and in fixed position thus maintaining the inclined side portions 16 and 17 in fixed position. The side support members 11 and 12 pivot into three separate positions. The transport position is shown in FIG. 2 and in FIGS. 4 and 5. A highway position is shown in FIG. 3 and in addition an unload position is provided but is not shown as this will be apparent from the following description and from study of FIG. 2.

In FIG. 2 the side support members 11 and 12 are held in fixed position thus defining the V-shaped receptacle for receiving rows of bales 30 and 32. This position is maintained by a latch mechanism omitted from other drawings for convenience of illustration but shown in detail in FIGS. 4 and 5. The latch mechanism includes a spring 40 extending between a lower end of the portion 24A and a suitable portion indicated at a hook 41 on the frame thus tending to pull the side support member 11 into the highway position shown in FIG. 3. The latch mechanism further includes a latch pin 42 mounted on the extension portion 24A at a position partway along that portion but spaced outwardly from the shaft 19 which defines the pivot axis of the side support member 11. The latch pin cooperates with a hook shaped latch member 43 including a hook 44 on an underside thereof which is of type similar to that well known in the art for latching doors or the like of a type which are under a heavy load when latched. The hook therefore does not wrap vigorously around the pin but is sufficient to hold the pin when latched but can readily release the pin despite the significant forces between the pin and the latch member due to the load applied. The latch member 43 is pivotally mounted on a pin 45 carried upon a bracket 46 attached to the struts 20. The pin 45 is thus held fixed to the frame and allows the latch member to pivot in a counterclockwise direction into a latching position and in a clockwise direction to a release position.

The latch pin is actuated by a push rod 47 which is pivotally connected to the latch member by a pin 48. An upper end of the push rod 47 includes a clevis engaged around each side of the flat plate forming the latch member 43. A lower end of the push rod 47 is attached to a horizontal bar 49 by a pivot pin 50. The bar 49 is mounted on one side of the respective transverse rail 22 and is pivotally mounted on a pin 51 which allows the bar 49 to be raised and lowered to actuate the movement of the latch member 43. The bar 49 is biased by a spring 52 into a raised position thus tending to hold the latch member in a clockwise rotated released position to allow reengagement with the pin 42 when the side support members return to the latch position. The bar 49 is held down against lifting movement by a hook portion 54 of an elongate bar 55 extending along the full length of the frame. The bar 55 is mounted upon each in turn of the cross rails 22 and is held in place by a bracket 56 which allows the bar 55 to move longitudinally but to prevent side to side or twisting movement. The hook portion 54 in the position thus shown in FIG. 5 holds the bar 49 against lifting. In this position therefore the pin 42 is latched by the latch member 43 thus holding the side support member 11 in the latch transport position.

The bar 49 can be released from its latch position shown by longitudinal movement of the bar 55 so that each of the hook portions 54 releases the respective bar 49 allowing that bar to be pulled upwardly by the spring 52 so the push rod pivots the latch member to release the pin 42 and to allow the side support portion 11 to fall.

When the side support member is fallen, the latch member 43 remains in the released position under the action of the spring 52. When the bales have been deposited, the side support member 11 is pulled by the spring 40 into the highway position shown in FIG. 3 which is raised above the normal transport position. As the side support members move into the raised highway position, the pin 42 passes by the hook portion 44 of the latch member 43 and engages a tail portion 57 of the latch member which pushes the latch member down back to the latch position thus forcing also the push rod 47 downwardly to return the bar 49 to the initial position. In this position the latch bar 55 can be moved manually to the holding position shown in FIG. 5.

As shown in FIG. 2, the trailer including the frame and the side support members can be loaded so that the first row of bales is provided on the receptacle defined by the side support member 11 and the second row of bales is provided on the receptacle defined by the side support member 12. A third row of bales can be located in the V-shaped area defined between the first two rows so that the trailer can be used to carry three rows of bales simultaneously thus providing a 50% increase in carrying capacity for a predetermined length of the trailer.

When the unloading location has been reached, the side support member on one side of the trailer is firstly unlatched to release the row 30 and the upper row simultaneously which fall under their own weight and roll away to the one side of the trailer. The upper row simultaneously deposited since it falls onto the area from which the row 30 is discharged and then rolls in that position outwardly to one side of the trailer. During the discharge the side support member 11 pivots downwardly taking a position generally outwardly and downwardly and extending from the rail 19 generally to the ground to provide a ramp on which the bales roll.

After the first unloading action is complete and the first and third rows are discharged, the second row is then discharged to the other side of the trailer by releasing the latch mechanisms of the side support member 12.

After the discharge is complete, the side support members automatically pivot upwardly under the action of the springs 40 to the maximum retracted position which is the highway position shown in FIG. 3. As explained above this reverses the action of the latch and moves the latch back to the initial position for a further cycle. It will be noted that in FIG. 3 in the highway position, the side support members 11 and 12 are raised above the normal transport position and thus the outermost edge of the side support member is moved inwardly to a position approximately equal to or just inside the outermost edge of the extension portion 14A. Thus the width of the side support members in the highway position can be reduced to an acceptable highway width which in many jurisdictions is a 8'6". Thus the trailer can be transported when unloaded at highway speed rather than at the allowable farm tractor speed which is necessary when an unloaded trailer is wider than the acceptable width.

Although it is highly preferred that the bales be loaded longitudinally, in some cases the bales may be loaded with the axis upright.

Since various modifications can be made in my invention as hereinabove described, and many apparently widely different embodiments of same made within the spirit and scope, it is intended that all matter contained in the accompanying specification shall be interpreted as illustrative only and not in a limiting sense.

I claim:

1. A bale transport device comprising a frame arranged for transport across the ground in a transport direction, the frame including a plurality of elongate longitudinal frame rails generally parallel to the transport direction and defining a length of the frame sufficient to receive thereon a predetermined number of cylindrical bales with an axis of the bales parallel to the frame members and a plurality of cross rails interconnecting the longitudinal frame rails, the frame including two parallel sides, a longitudinally extending fixed apex portion arranged centrally between the sides and two inclined support portions each being formed from fixed longitudinal and transverse rails and defining a fixed support surface for receiving said bales thereon with the transverse rails extending from the apex portion to a respective one of the sides of the frame so as to be outwardly and downwardly inclined toward the respective side; two side support members each pivotally mounted on the frame at a respective one of the sides for pivotal movement about a longitudinal horizontal pivot axis at the respective side of the frame, each of the side support members being formed from longitudinal and transverse rails and defining a support surface for receiving said bales thereon, each of the side support members being pivotally movable about said pivot axis between a first support position in which the support surface of the side support member is inclined outwardly and upwardly from the respective side so as to form with the support surface of a respective one of said inclined support portions a V-shaped receptacle for said bales, and a second unload position in which the support surface of the side support member is inclined outwardly and downwardly to allow a bale from said receptacle to roll under its own weight outwardly and downwardly for unloading onto the ground; and means for retaining said side support members in the first support position.

2. The bale transport device according to claim 1 wherein the retaining means comprises manually releasable latch means.

3. A bale transport device comprising a frame arranged for transport across the ground in a transport direction, the frame including a plurality of elongate longitudinal frame rails generally parallel to the transport direction and defining a length of the frame sufficient to receive thereon a predetermined number of cylindrical bales with an axis of the bales parallel to the frame members and a plurality of cross rails interconnecting the longitudinal frame rails, the frame including two parallel sides, a longitudinally extending apex portion arranged centrally between the sides and two inclined support portions each defining a fixed support surface for receiving said bales thereon and inclined downwardly from the apex portion to a respective one of the sides of the frame; two side support members each pivotally mounted on the frame at a respective one of the sides for pivotal movement about a longitudinal horizontal pivot axis at the respective side of the frame, each of the side support members being formed from longitudinal and transverse rails and defining a support surface for receiving said bales thereon, each of the side support members being pivotally movable about said pivot axis between a first support position in which the support surface of the side support member is inclined outwardly and upwardly from the respective side so as to form with the support surface of a respective one of said inclined support portions a V-shaped receptacle for said bales, and a second unload position in which the support surface of the side support member is inclined outwardly and downwardly to allow a bale from said receptacle to roll under its own weight outwardly and downwardly for unloading onto the ground; and means for retaining said side support members in the first support position wherein each of the side support members is pivotally movable to a third position in which the side support member is raised to a position above the first position so that an outside edge of the side support member is brought inwardly to define an allowable highway transportation width between the outside edges of the side support members.

4. The bale transport device according to claim 3 wherein in the third position the distance between the outside edges of the side support members is approximately equal to the width of the frame.

5. The bale transport device according to claim 1 wherein the frame includes a substantially vertical side frame portion extending from a base frame portion to a respective one of the side support members, an upper rail of the side frame portion defining the pivot axis of a respective one of the side support members.

6. A bale transport device comprising a frame arranged for transport across the ground in a transport direction, the frame including a plurality of elongate longitudinal frame rails generally parallel to the transport direction and defining a length of the frame sufficient to receive thereon a predetermined number of cylindrical bales with an axis of the bales parallel to the frame members and a plurality of cross rails interconnecting the longitudinal frame rails, the frame including two parallel sides, a longitudinally extending apex portion arranged centrally between the sides and two inclined support portions each defining a fixed support surface for receiving said bales thereon and inclined downwardly from the apex portion to a respective one of the sides of the frame; two side support members each pivotally mounted on the frame at a respective one of the sides for pivotal movement about a longitudinal horizontal pivot axis at the respective side of the frame, each of the side support members being formed from longitudinal and transverse rails and defining a support surface for receiving said bales thereon, each of the side support members being pivotally movable about said pivot axis between a first support position in which the support surface of the side support member is inclined outwardly and upwardly from the respective side so as to form with the support surface of a respective one of said inclined support portions a V-shaped receptacle for said bales, and a second unload position in which the support surface of the side support member is inclined outwardly and downwardly to allow a bale from said receptacle to roll under its own weight outwardly and downwardly for unloading onto the ground; and means for retaining said side support members in the first support position wherein each of the pivot axes is arranged inwardly of an outermost edge of the respective inclined support portion such that an edge portion of the inclined support portion extends outwardly and downwardly beyond the respective pivot axis.

7. The bale transport device according to claim 2 wherein each of the side support members includes an edge portion thereof extending inwardly from the respective pivot axis and wherein the latch means is mounted on the frame and cooperates between the frame and the edge portion of the side support member.

8. The bale transport device according to claim 6 wherein each of the side support members is pivotally movable to a third position in which the side support member is raised to a position above the first position so that an outside edge of the side support member is brought inwardly approximately vertically aligned with the edge of the inclined support portion.

9. The bale transport device according to claim 1 including spring means biassing each of the side support members from the second unload position toward the first support position.

10. The bale transport device according to claim 3 including spring means biassing each of the side support members from the second unload position toward the third position.

11. A bale transport device comprising a frame arranged for transport across the ground in a transport direction, the frame including a plurality of elongate longitudinal frame rails generally parallel to the transport direction and defining a length of the frame sufficient to receive thereon a predetermined number of cylindrical bales with an axis of the bales parallel to the frame members and a plurality of cross rails interconnecting the longitudinal frame rails, the frame including two parallel sides, a longitudinally extending apex portion arranged centrally between the sides and two inclined support portions each defining a fixed support means for receiving said bales thereon and inclined downwardly from the apex portion to a respective one of the sides of the frame; two side support members each pivotally mounted on the frame at a respective one of the sides for pivotal movement about a longitudinal horizontal pivot axis at the respective side of the frame, each of the side support members being formed from longitudinal and transverse rails and defining a support surface for receiving said bales thereon, each of the side support members being pivotally movable about said pivot axis between a first support position in which the support surface of the side support member is inclined outwardly and upwardly from the respective side so as to form with the support surface of a respective one of said inclined support portions a V-shaped receptacle for said bales, and a second unload position in which the support surface of the side support member is inclined outwardly and downwardly to allow a bale from said receptacle to roll under its own weight outwardly and downwardly for unloading onto the ground; and means for retaining said side support members in the first support position wherein the retaining means comprises a first latch means assembly for cooperation with a first one of the side support members and a second latch means assembly separate from the first latch means assembly for cooperation with a second one of the side support members, each of the first and second latch means assemblies comprising a plurality of separate latch members arranged at spaced positions along the length of the side support member and including a longitudinal slideable latch bar having a plurality of latch engaging members thereon, each latch engaging member being arranged to hold a respective one of the latch members in a latching position and being releasable therefrom simultaneously with the others of the latch members by longitudinal movement of the latch bar.

12. The bale transport device according to claim 11 wherein the frame includes a plurality of transverse frame rails each of which is aligned with a respective one of a plurality of transverse rails of the side support member and wherein each latch member extends between a transverse rail of the frame and a transverse rail of the side support member.

13. The bale transport device according to claim 11 wherein each latch member includes a hook portion for engaging over a pin on the transverse rail of the side support member and a release bar pivotally movable to a raised position to move the hook member to a release position.

* * * * *